March 31, 1925.

G. C. WALKER

CHAIN FASTENER

Filed April 30, 1923

G. C. Walker, INVENTOR, by Frank Fuller

ATTORNEY.

Patented Mar. 31, 1925.

1,531,770

UNITED STATES PATENT OFFICE.

GROVER C. WALKER, OF JARDINE, MONTANA.

CHAIN FASTENER.

Application filed April 30, 1923. Serial No. 635,425.

*To all whom it may concern:*

Be it known that GROVER C. WALKER, a citizen of the United States, residing at Jardine, in the county of Park and State of Montana, has invented certain new and useful Improvements in Chain Fasteners, of which the following is a specification.

This invention relates to a fastener or coupling for chains and the like and particularly the side ones of those applied to vehicle tires to prevent skidding.

It is aimed to provide a generally improved, simplified, and inexpensive construction involving the features of novelty which will become apparent from consideration of the accompanying drawings and following description and hereinafter claimed.

In said drawings:—

Figure 2:
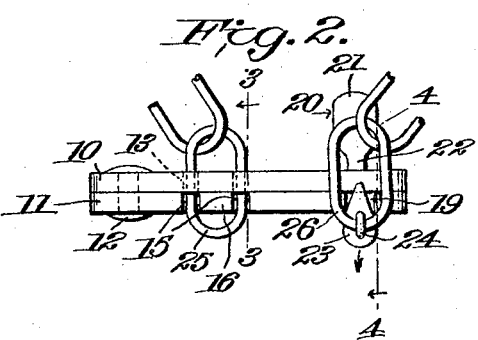
Fig. 2 is a plan view of the fastener connecting the end links of a chain.
Figure 3:
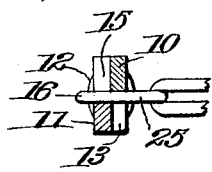
Figure 4:
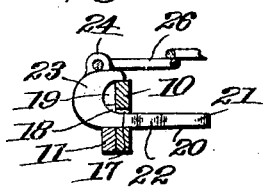

Figs. 3 and 4 are cross-sectional views taken on the lines 3—3 and 4—4 respectively of Fig. 2.

Like characters designate like or similar parts in the different views.

In carrying out the invention, two metallic bars or plates 10 and 11 are provided, which are pivotally connected together by a pin 12. Plate 10 has spaced parallel slots 13 opening at and inclining inwardly from one longitudinal edge thereof providing an intermediate lug 14, while plate 11 has slots 15 similar thereto but opening at and inclining inwardly from the opposite longitudinal edge and providing intermediate lug 16. Slots 13 and 15 follow intersecting lines and at their inner ends are arcuate. They also register when the fastener is closed.

Adjacent the free end of plate 10 a longitudinally elongated slot 17 is provided.

Plate 11 has a longitudinally elongated slot 18, adapted to register with slot 17 in closed position of the plates. Slot 18 has a central branch 19 flaring outwardly therefrom to one of the longitudinal edges of plate 11.

A hook member 20, is adapted for insertion into slots 17 and 18 at a finger piece 21 which has a reduced portion 22, from which a hook 23 extends having a pin or staple 24 thereon.

Figure 1:
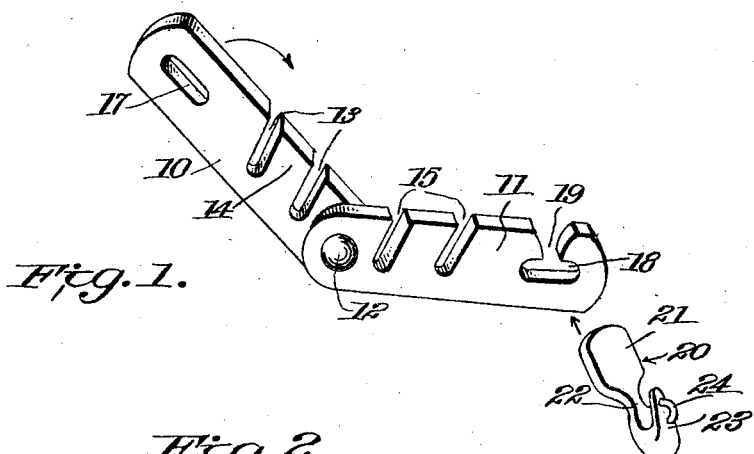
Fig. 1 is a perspective view of the improved fastener, with its bars open.

In using the fastener as in connection with a terminal or end links 25 and 26, or a side chain of an anti-skid chain or otherwise, and with the plates open as suggested in Fig. 1, link 25 is disposed in the slots 13 whereupon the plates 10 and 11 are closed so that such link 25 will also be located in slots 15. In this position, the lugs 14 and 16 penetrate the opening of the link. Before or at this stage and with link 26 fastened to hook member 20 by staple 24, finger piece 21 by lateral movement is passed through the slots 18 and 17 in the order mentioned so that hook 23 will occupy branch slot 19 and its bill overlap plate 10 whereby the plates 10 and 11 cannot swing relatively on pin 12.

The tension of the chain draws and maintains said hook 23 in place locking the plates 10 and 11 against separation. In detaching the chain finger piece 21 is pushed outwardly slightly and against the tension of the chain in the direction of the arrow in Fig. 2 to align reduced portion 22 with branch slot 19 after which plate 11 is separated by swinging movement from plate 10 to release link 25. Thereafter hook member 20 may be completely detached from the plates.

Changes may be made within the spirit and scope of the invention and the appended claims.

I claim as my invention:—

1. A fastener of the class described having relatively movable plates, one of the plates having substantially inclined slots extending inwardly from a longitudinal edge thereof, the other plate having substantially inclined slots extending inwardly from a longitudinal edge thereof and in the opposite direction to the first mentioned slots and on lines intersecting the lines thereof, said slots adapted to be occupied by an article, and said plates having slots therethrough to receive a portion of the article to prevent movement of the plates, and one of the last mentioned slots having a lateral branch in combination with said portion, said portion having a reduced portion normally disaligned with the branch and capable of alignment therewith to permit movement of one plate relatively to the other plate.

2. A fastener of the class described having relatively movable plates provided with slots from one of which a branch leads, a hook member receivable in said slots to connect an element to the fastener, said member having a hook to overlap the plates, said member having a reduced portion normally disaligned with the branch and capable of alignment therewith to permit movement of one plate relatively to the other plate.

In testimony whereof I affix my signature.

GROVER C. WALKER.